(12) United States Patent
Newman

(10) Patent No.: US 6,571,940 B2
(45) Date of Patent: Jun. 3, 2003

(54) FLAT ARTICLE HOLDER

(76) Inventor: Chris M. Newman, 3602 S. Adams Rd., Veradale, WA (US) 99037

( * ) Notice: Subject to any disclaimer, the term of this patent is extended or adjusted under 35 U.S.C. 154(b) by 0 days.

(21) Appl. No.: 09/872,377

(22) Filed: Jun. 1, 2001

(65) Prior Publication Data
US 2002/0179463 A1 Dec. 5, 2002

(51) Int. Cl.$^7$ .................. A45C 15/00; B65D 71/00; G06K 5/00
(52) U.S. Cl. ............... 206/38; 206/37; 206/234; 235/380; 235/449; 235/486; 283/904
(58) Field of Search .................. 206/234, 37, 37.1, 206/38; 235/449, 486, 379–381; 283/76, 61, 904

(56) References Cited

U.S. PATENT DOCUMENTS

| | | |
|---|---|---|
| 464,405 A | 12/1891 | Widmann |
| 973,930 A | 10/1910 | Fink |
| 1,422,233 A | 7/1922 | Stern |
| 1,590,492 A | 6/1926 | Benson |
| 2,316,655 A | 4/1943 | Voos |
| 2,630,212 A | 3/1953 | Mosch |
| 2,804,969 A | 9/1957 | Barnett |
| 2,875,515 A | 3/1959 | Sieminski |
| 3,325,632 A | 6/1967 | Lilly et al. |
| 3,744,542 A | 7/1973 | Stephens et al. |
| 3,958,690 A | 5/1976 | Gee, Sr. |
| 4,037,716 A | 7/1977 | Marks |
| 4,300,610 A | 11/1981 | China |
| 4,331,194 A | 5/1982 | Lederer |
| 4,417,612 A | 11/1983 | Couture et al. |
| 4,457,425 A | 7/1984 | Cooper et al. |
| 4,934,528 A | 6/1990 | Miller et al. |
| 4,946,030 A | 8/1990 | Guridi et al. |
| 5,020,255 A | 6/1991 | Rodel |
| 5,080,223 A | 1/1992 | Mitsuyama |
| 5,199,573 A | 4/1993 | Gribovsky |
| 5,308,121 A * | 5/1994 | Gunn ................... 283/904 |
| 5,328,026 A | 7/1994 | Newman |
| 5,503,434 A * | 4/1996 | Gunn ................... 283/904 |
| 5,620,090 A | 4/1997 | Beely |
| 5,653,332 A | 8/1997 | DeWitt, Jr. |
| 5,720,381 A | 2/1998 | Betancourt |
| 5,933,893 A | 8/1999 | Padden |
| 6,009,584 A | 1/2000 | Padden |
| 6,044,967 A * | 4/2000 | Painsith ................ 206/234 |
| 6,076,661 A | 6/2000 | Abadi |
| 6,145,994 A | 11/2000 | Ng |
| D434,624 S | 12/2000 | Padden |
| 6,257,405 B1 * | 7/2001 | Painsith ................ 206/234 |

FOREIGN PATENT DOCUMENTS

| | | |
|---|---|---|
| DE | 3827 536 C1 | 8/1988 |

* cited by examiner

*Primary Examiner*—Bryon P. Gehman
(74) *Attorney, Agent, or Firm*—Wells St. John P.S.

(57) ABSTRACT

An article holder includes a card body with one or more panels covering article receiving pockets formed within a core member. The holder may also be provided with an embossing zone for receiving embossed alpha numeric indicia as typically provided in transaction cards, and/or an electronically readable zone containing electronically readable media separate from an article holder zone. In a preferred form the holder may be provided with an adhesive surface covered by a removable strip. The strip may be removed from the adhesive to permit attachment of an identification card to the holder.

23 Claims, 7 Drawing Sheets

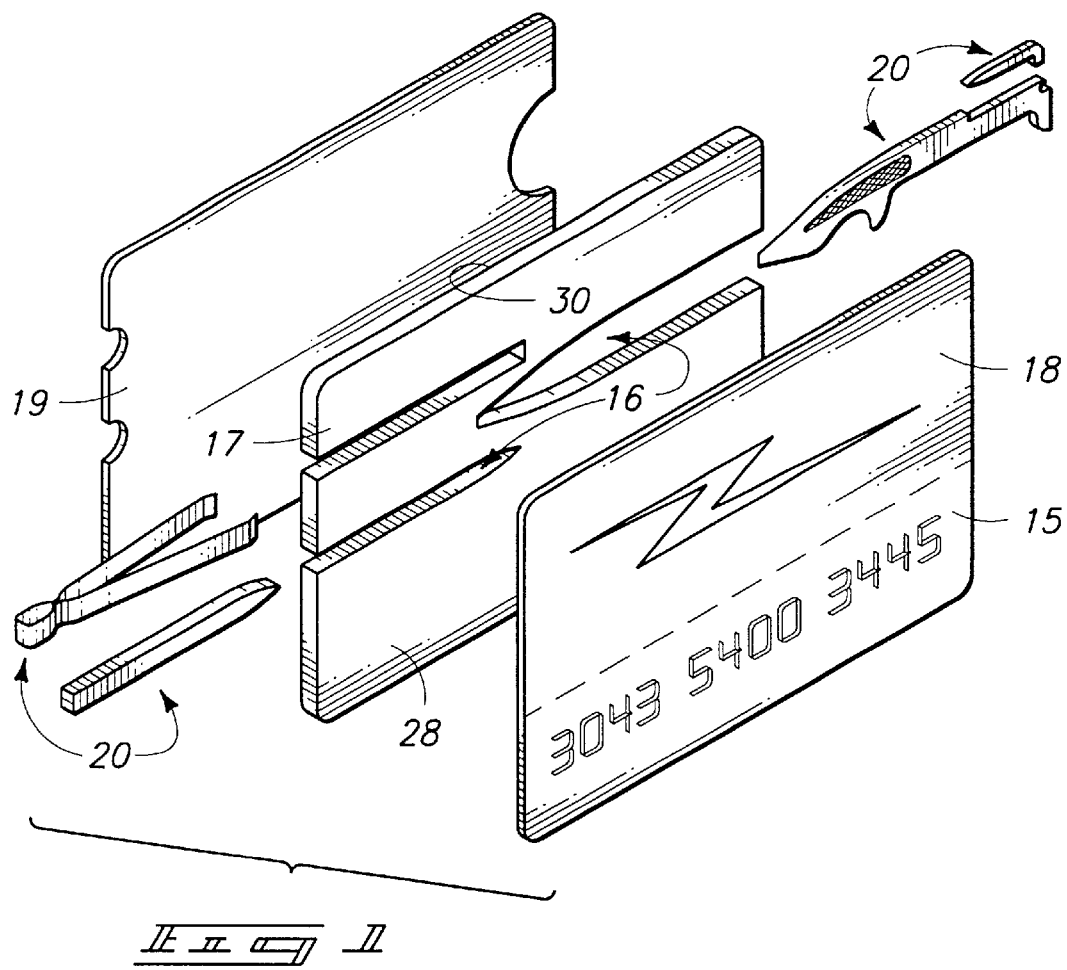
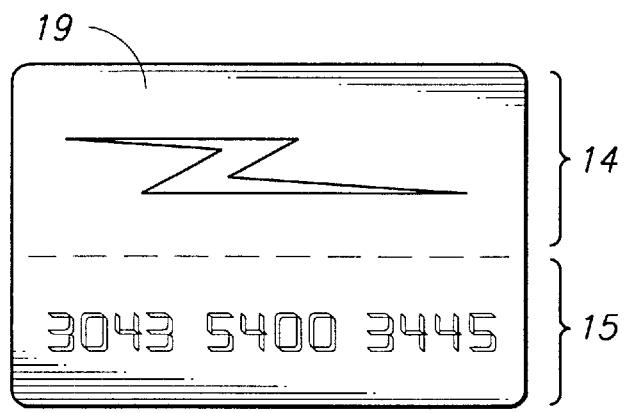

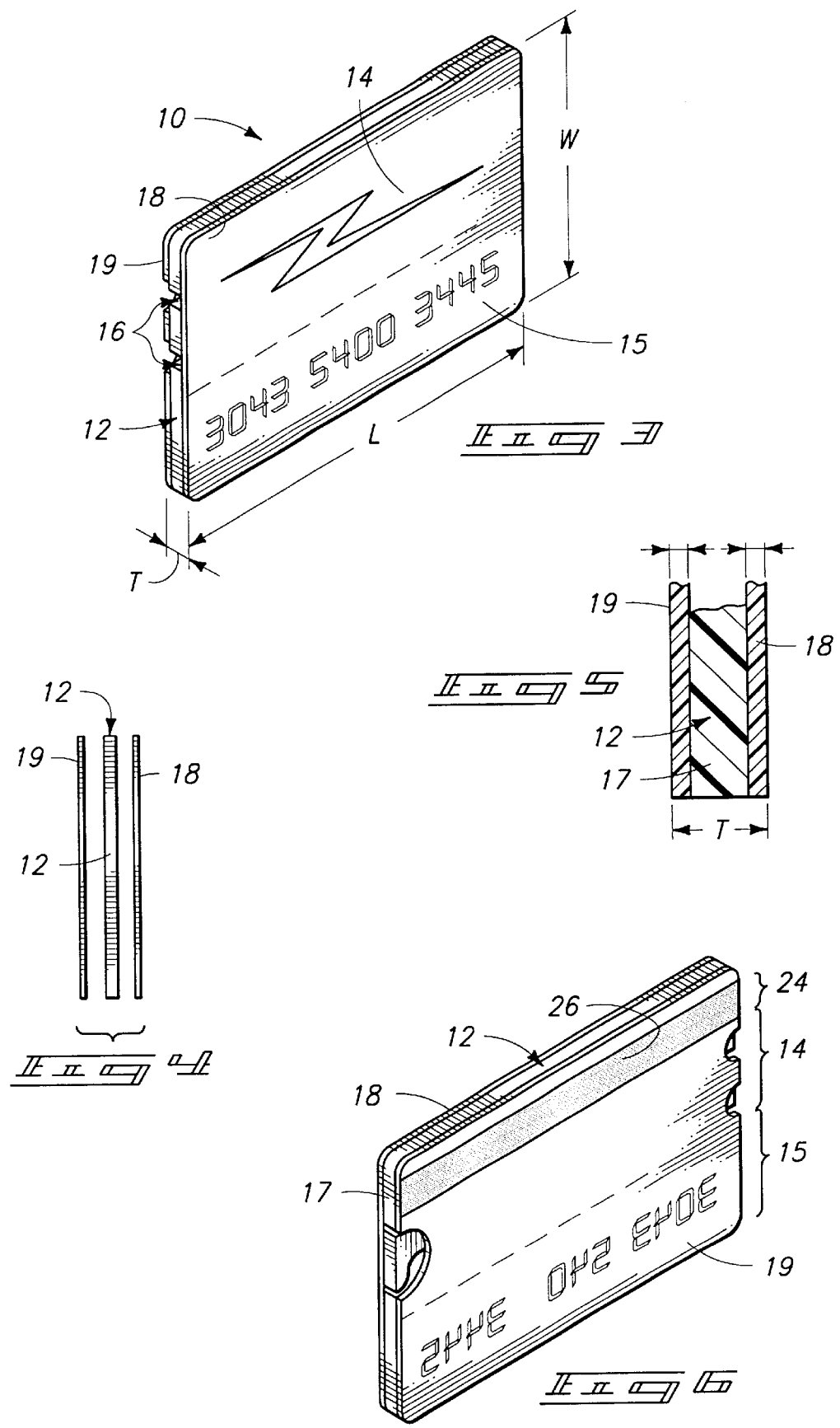

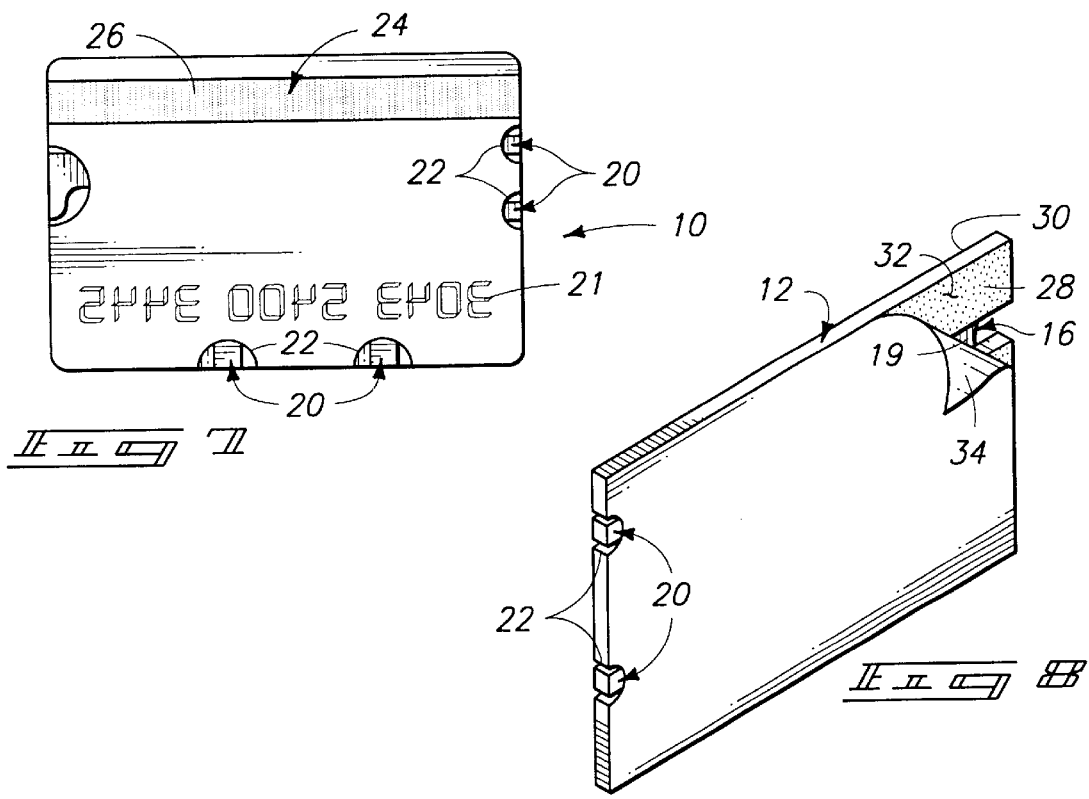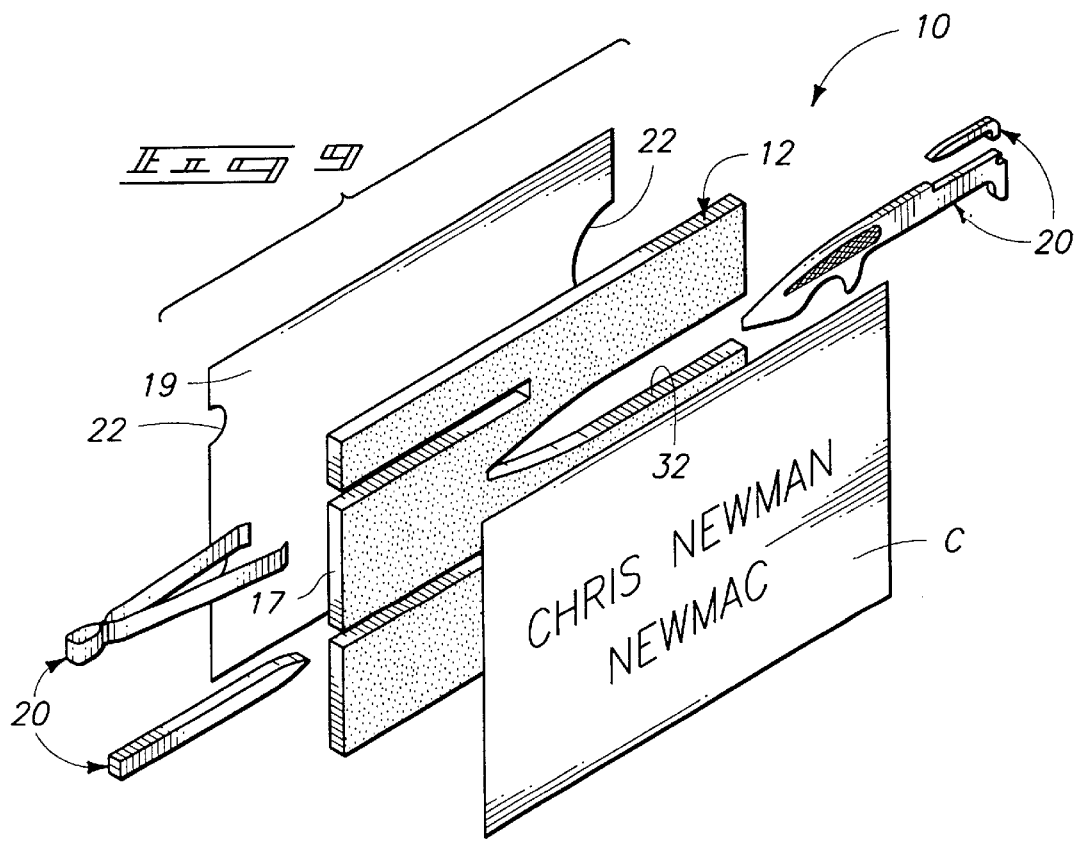

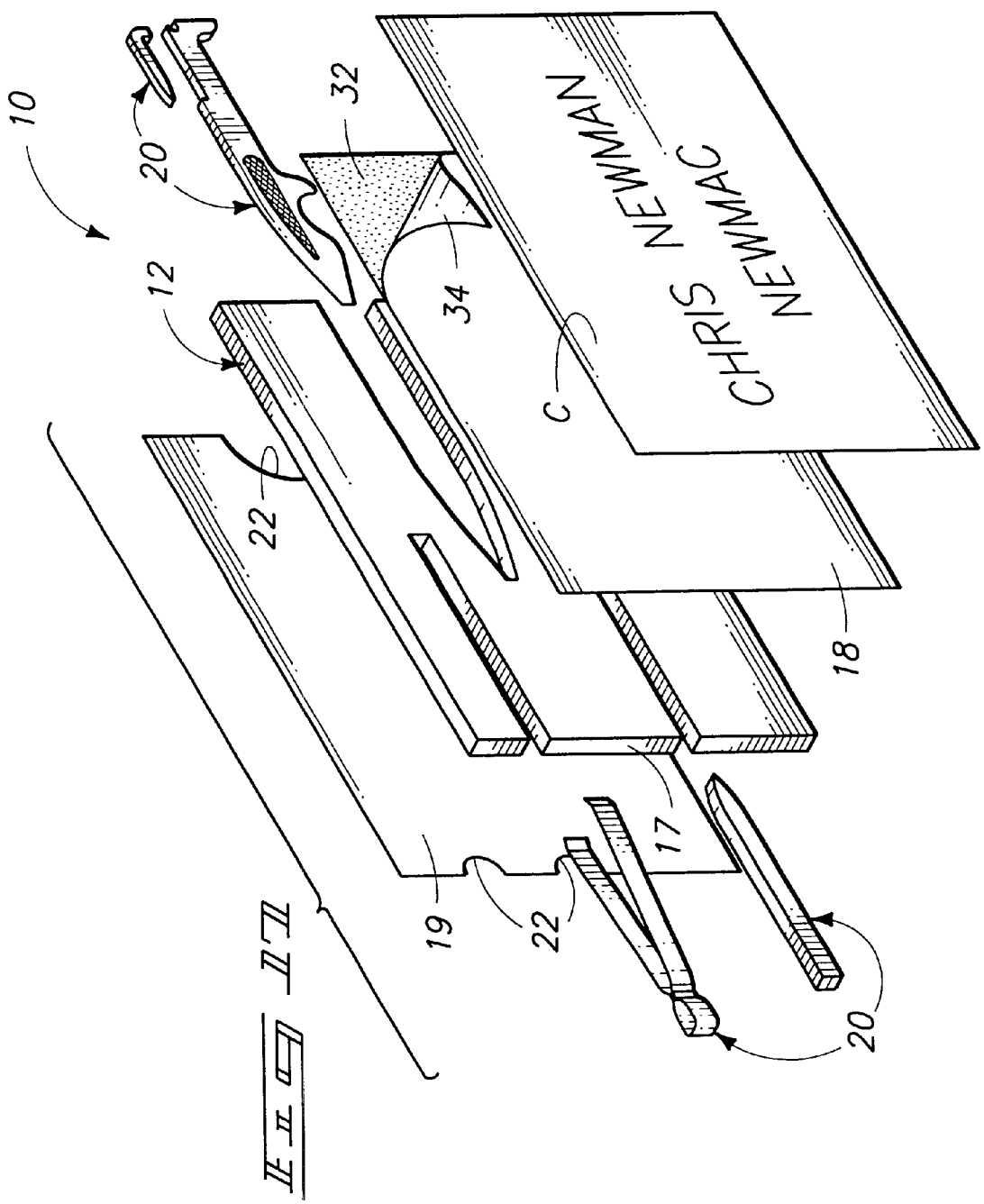

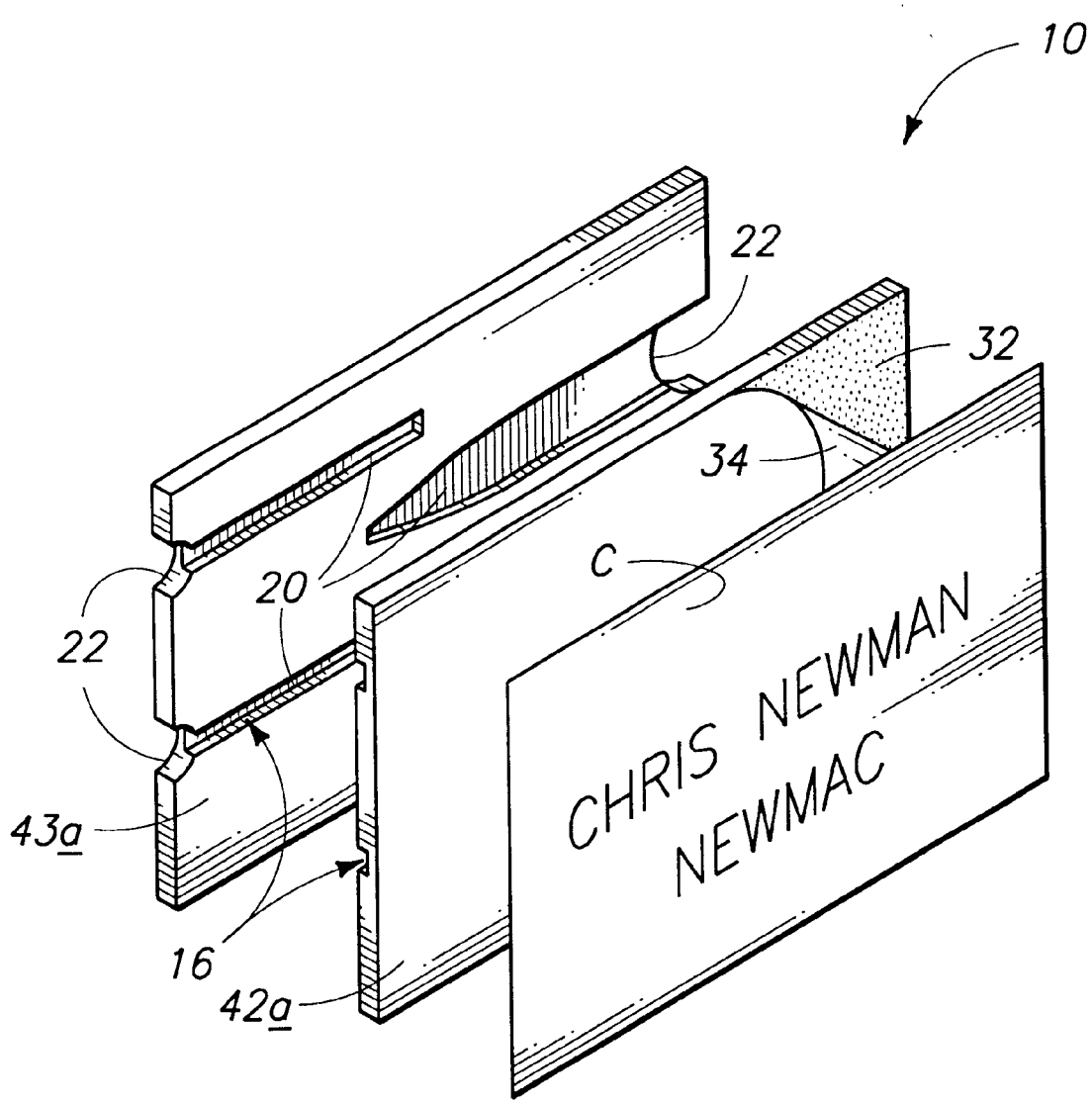

FLAT ARTICLE HOLDER

TECHNICAL FIELD

The present invention relates to holder for articles and more particularly to such holders that are flat and in a card configuration.

BACKGROUND OF THE INVENTION

Credit and business cards are carried by numerous individuals, not for immediate use, but for availability should a need arise. The cards occupy a significant space in a pocket, wallet or other carrier. Thus a card that is not being used becomes an inconvenience to carry.

It is also desirable for some individuals to carry certain articles or tools that are useful but that are not used continuously. Examples of such articles are nail files, toothpicks, letter openers, tweezers and the like. Such articles are found in multiple use pocket knives, and in some flat card shaped carriers.

The multiple use pocket knife is advantageous in that the knife handle is often useful as a handle for the selected tool. The disadvantage of the pocket knife is that it is bulky.

The card shaped holder is desirable for the overall reduced size of the carrier. However, it would be of further use to have the carrier perform a function in addition to simply holding the articles.

U.S. Pat. No. 5,328,026 to Newman, the present Applicant, discloses a flat multiple tool holder that is useful to releasably hold a number of tools in a thin flat carrier. Outer surfaces of the holder may be used for printing logo, advertising material and other information.

BRIEF DESCRIPTION OF THE DRAWINGS

Preferred embodiments of the invention are described below with reference to the following accompanying drawings.

FIG. 1 is an exploded perspective view showing components of an exemplary article holder;

FIG. 2 is a front elevation view identifying an article holder zone and an embossing zone in the exemplary holder;

FIG. 3 is a perspective view of an embossed holder;

FIG. 4 is an exploded edge view showing a core member and opposed covers in position for lamination;

FIG. 5 is an enlarged cross-section view showing different relative thickness dimensions;

FIG. 6 is a perspective view of an example holder including a magnetic stripe, an embossing zone and an article holder zone;

FIG. 7 is a view similar to FIG. 6 only showing a variation of positioning for articles on the holder;

FIG. 8 is a perspective view showing a portion of a removable strip being pulled away from the core part to expose an adhesive surface underneath;

FIG. 9 is an exploded perspective view illustrating the holder and a identification card in position to be adhesively secured to the core;

FIG. 17 is an exploded perspective view of an article holder with a core part and two covers, one of which includes an adhesive surface for mounting an identification card; and FIG. 18 is an exploded perspective view of a two piece holder with indentations on each forming part of an article holder pocket.

DESCRIPTION OF EXEMPLARY EMBODIMENTS

Figure 10:
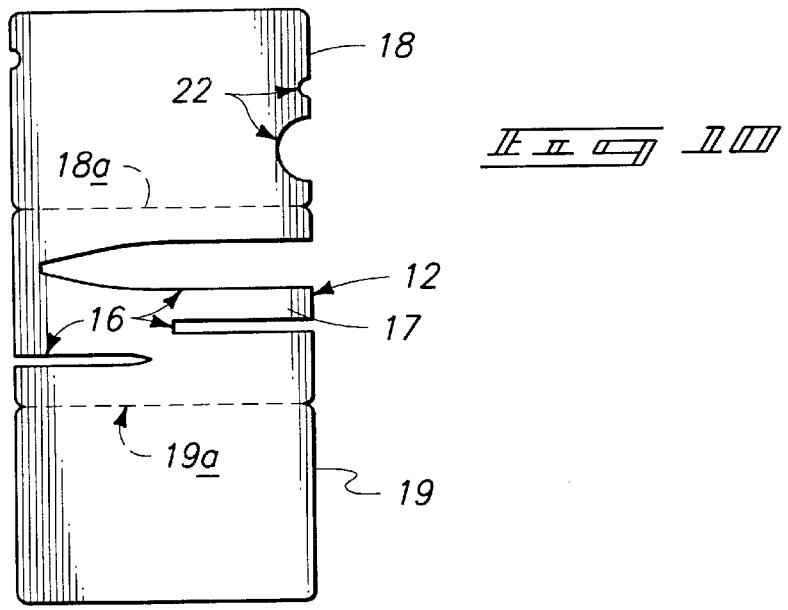
FIG. 10 is a flat plan view illustrating a holder in which the core and cover members are joined at fold lines.

This disclosure of the invention is submitted in furtherance of the constitutional purposes of the U.S. Patent Laws "to promote the progress of science and useful arts" (Article 1, Section 8).

GENERAL DESCRIPTION

Before describing the invention in detail, general descriptions of basic aspects of the invention will be given.

In the first aspect, in article holder 10 includes a body 12 with a thickness dimension T, a length dimension L and width dimension W. The thickness dimension T is less than the length L and width W dimensions. The body includes an article holder zone 14 and an embossing zone 15. At least one pocket 16 is formed in the body within the article holder zone and that is shaped to releasably receive an article. A cover 18 is provided on the body spanning said at least one pocket 16. The body within the embossing zone includes a thickness dimension T capable of use in an embossed card printing machine.

In another aspect, the invention includes an electronically readable transaction card article holder 10 that includes a body 12 with a thickness dimension T, a length dimension L, and a width dimension W. The thickness dimension T is less than the length dimension L and the width dimension W. The body includes an article holder zone 14 and at least one pocket 16 formed in the body within the article holder zone that is shaped to releasably receive an article. A non-magnetic article 20 is provided to be releasably received within each pocket 16. The body also includes a cover 18 spanning the pocket(s) 16, and an access 22 opens into each pocket 16 to allow finger access to the article 20 therein. An electronically readable zone 24 (FIG. 6) is formed along the body and electronically readable media is provided across the electronically reader zone 24.

In a further aspect, an article holder 10 is comprised of a body 12 having a thickness dimension T, a length dimension L and width dimension W. The thickness dimension T is less than the length dimension L and the width dimension W. The body 12 includes a front surface 28 and a back surface 30. The body further includes an article holder zone 14 and at least one pocket 16 formed in the body within the article holder zone that is shaped to releasably receive an article. A pressure sensitive adhesive 32 is formed along at least a part of the front surface 28. A removable strip 34 is provided to cover the pressure sensitive adhesive. The front surface 28 and pressure sensitive adhesive 32 are shaped and disposed to receive and secure an identification card.

In a further aspect, a process for producing a flat article holder 10 includes the steps of providing a card body 12 including at least one pocket 16 shaped to releasably receive an article. Other steps include exposing a pressure sensitive adhesive surface 32 on the card body 12 and adhering an identification card C to the adhesive surface such that the identification card spans said at least one pocket 16. A further step includes selectively storing and removing an article to and from said at least one pocket 16.

In a still further aspect, a process for making an electronically readable transaction card article holder 10 includes the steps of providing a card body 12 in the shape of a transaction card and having oppositely facing front and back surfaces 28, 30 forming at least one article receiving pocket 16 in the body. Another step includes covering said at least one pocket 16 on at least one of the surfaces 28 or 30. A further step includes providing an article 20 releasably receivable in said at least one pocket 16. A further step includes providing a finger access 22 to the article 20 to enable placement and removal of the article 20 to and from said at least one pocket 16. A still further step includes providing electronically readable media 26 along the article holder body 12.

In a still further aspect, a process for forming a flat article holder 10 includes the steps of obtaining a sheet of plastic 38 having a front and back surface 28, 30; and laser cutting the sheet through the front and back surface to form a core part 17 with at least one article receiving pocket 16 formed therein. Another step includes laminating a first cover sheet 18 to the front surface 28 to span said at least one article receiving pocket 16. Another step includes laminating a second cover sheet 19 to the back surface also to span said at least one article receiving pocket 16. A further step includes providing a finger access 22 to each article receiving pocket 16. Still further steps include providing an adhesive surface on one of the cover sheets and providing a removable backing strip over the adhesive surface.

A still further aspect includes an article holder 10 with a body 12 having a thickness dimension T, a length dimension L and a width dimension W similar to that of an identification card (such as a business card C). The body 12 is formed of at least two panels 42, 43 (FIGS. 8, 14) or 42a, 43a (FIG. 18) joined together (see examples in FIGS. 8, 14 and 18). One of the panels (42, 42a or 43, 43a) includes at least a part of one pocket 16 formed therein to releasably receive an article. The at least two panels 42, 43 or 42a, 43a are secured together with said at least one pocket part being disposed between the panels. An adhesive surface 34 is on one of the panels securing an identification card C.

DETAILED DESCRIPTION

It is noted that numerous examples of aspects of the invention and features thereof are shown in the drawings. It is pointed out that various features may be interchanged between the examples illustrated, and that the examples may further be modified within the scope of the claims appended hereto.

In referring to the examples illustrated, reference will first be made to FIGS. 1–6. Here, the article holder 10 is shown to be comprised of three individual holder components for receiving various articles 20. In the illustrated example, the articles include a combined screwdriver, nail file, bottle opener, a pair of tweezers, a small screwdriver and a toothpick. Other tools or articles of various configurations such as sewing kits, golf tools, mirrors, magnifiers, combs and still other articles may be used as well so long as the article thickness is no greater than the thickness of the core part 17. Examples of articles are also illustrated in U.S. Pat. No. 5,328,026 which is hereby incorporated by reference in the present application.

The exemplary holder 10 includes the body portion 12 and cover portions 18, 19. The first cover 18 may be considered a first laminate spanning the body on one side and defining the embossing zone 15. In actual practice, the embossing may be formed through the entire holder thickness as is typically found with credit cards or identification cards that include indicia formed using standard embossing procedures. The first laminate, however, shows the embossing 21 in clearly readable form.

The second cover 19 or laminate may include the access 22 that facilitates finger gripping of the articles within the holder. The access 22 may be comprised of a number of indentations formed along the laminate edge, positioned to overlap the pockets 16 when the holder is assembled.

It is preferred that the access 22 be formed on the second laminate 19, opposite to the side 18 of the card having the visibly readable embossing 21. It is also possible to have the electronically readable zone 24 provided on the second cover or laminate 19. The zone 24 may be provided with an electronically readable media such as the magnetic stripe 26 which could also be provided on the first laminate 18 along with embossing 21.

In some exemplary forms, one or more of the core part and cover or covers may be formed of transparent or transluscent materials. Color may also be added for decorative effect.

It is pointed out that the laminates 18 and 19 are most preferably substantially thinner than the core part 17 (see FIGS. 4 and 5). This is to minimize the overall thickness of the holder which is preferably under 0.045 inches; and to maximize the core and allowable article thickness. Actually, the preferred overall thickness is somewhat less (about 0.038 inches to most resemble the typical transaction card). Furthermore, the length and width dimensions are preferred to be similar to that of a transaction card or approximately 2.125 inches wide by 3.375 inches long. These dimensions are standard for transaction cards and are preferred for the purposes of enabling use of the present holder as a credit card or readable identification card; to minimize the bulk of the holder; and to provide access to the stored articles 20.

The laminate covers 18, 19 are preferably affixed by adhesive or by other means in flush contact with the core 17 to complete the thickness dimension of transaction card versions. In versions where the holder is used with an identification card, the thickness dimension is not so critical but is still preferred to be minimal.

It is pointed out that for purposes of explanation, the thickness dimension is exaggerated in the drawings. The same is true of the thickness dimensions of the covers and core part. In another working example, covers 18, 19 may each include thickness dimensions of approximately 0.007 inches and the core part 17 includes a thickness dimension of approximately 0.020 inches. This produces a total thickness dimension for the holder of approximately 0.034 inches. Thicknesses of the individual cover members or core may vary slightly from the above dimension but is preferably selected so the overall thickness T is within a range that will allow use of the holder in a standard card reading apparatus.

It is preferable that the pockets 16 be provided within one or more article holder zones 14 separate from the embossing zone 15 and/or the electronic reader zone 24. It is conceivable, however, that the electronic reader zone 24 could be provided on or directly adjacent to the external surface of the appropriate cover and, therefore, could enable positioning of pockets and articles in close proximity to the zone 24. However, if magnetic stripes are used, it is most preferred that the adjacent articles 20 be formed of a non-magnetic material such as nonmagnetic stainless steel, plastic, aluminum or other appropriate material. It is also most preferable that the article holder zone and articles be spaced clear of the electronically readable zone to avoid any possible interference with reader equipment.

It is also pointed out that the electronically readable zone and the electronically readable media may be provided by sources other than magnetic stripes. For example, one or more imbedded microchips might be used as commonly provided in "smart cards" within the present holder and situated therein within an area clear of the pockets 16 and articles 20.

Figure 11:
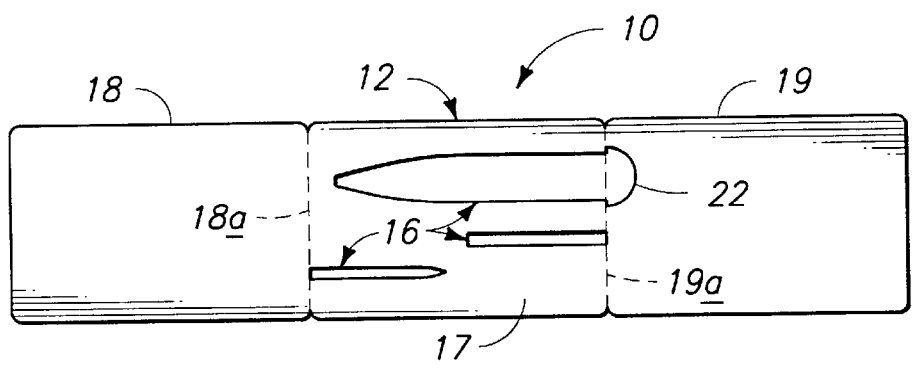
FIG. 11 is a flat plan example showing a different arrangement of the core and covers.
Figure 12:
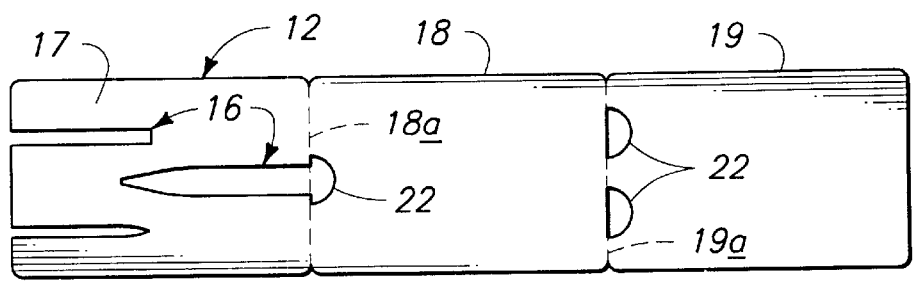
FIG. 12 is a view similar to FIG. 11 only showing another example of possible cut-outs for a core, cover, and finger access.

While FIG. 1 identifies the illustrated example as being comprised of three individual holder components (two covers and a core) it is possible that fewer than three may be used. For example, FIGS. 10, 11, and 12 illustrate a folded configuration in which the covers 18, 19 may be provided as a unit with the core part 17. The covers, in this situation, would fold on the exemplary dashed lines 18a, 19a to cover opposed surfaces of the core part 17.

The folded covers 18, 19 may be secured by adhesive, sonic welding, or other appropriate chemical or mechanical means to opposed surfaces of the core part to produce an article holder equivalent to that shown in FIGS. 1–6.

In fact, FIGS. 10–12 are merely examples and several more configurations could also be used. For example, the three components shown vertically arranged in FIG. 10 could be altered such that one of the horizontal covers could be attached to the core part 17 along a vertical fold line as are the covers shown in FIGS. 11, 12.

Likewise, the core part 17 may be shifted as identified by comparing FIGS. 11 and 12 from the central area of the flat pattern as shown in FIG. 11 to either of the end portions as exemplified in FIG. 12. Other variations could be envisioned without departing from the scope of my invention.

Figure 13:
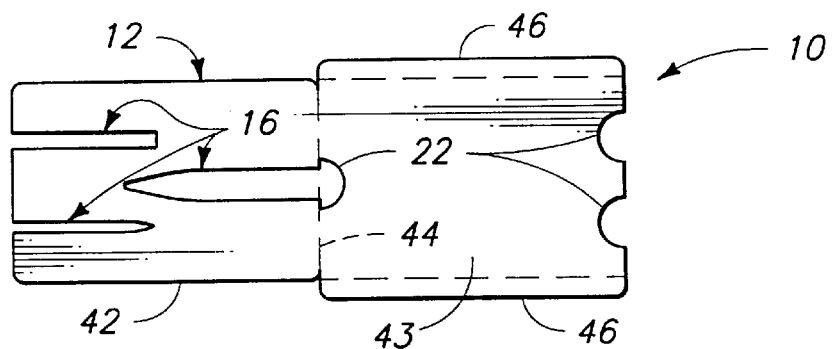
FIG. 13 is a further example of a holder with a single cover.
Figure 14:
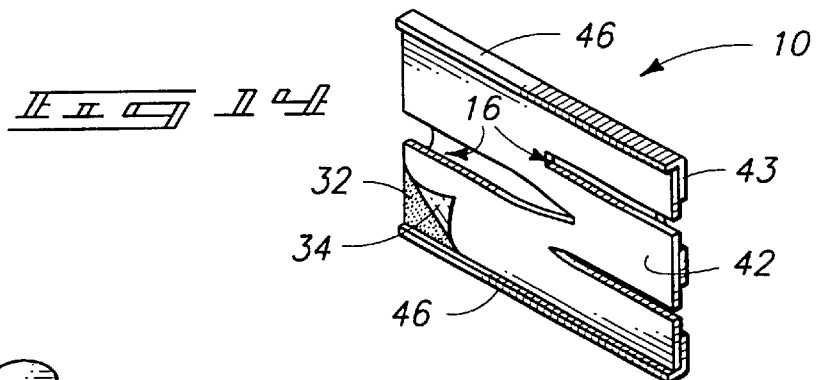
FIG. 14 is a view of the pattern shown in FIG. 13 in a folded and laminated condition, and with a removable strip partly pulled away to expose a pressure sensitive adhesive.
Figure 15:
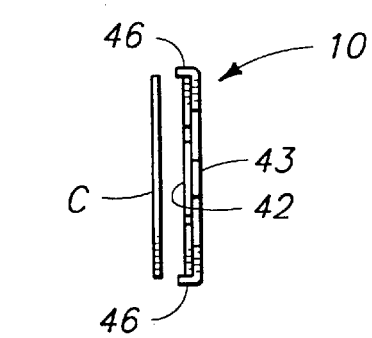
FIG. 15 is an exploded end view of the FIG. 14 example and showing a identification card in position to be secured to the holder.

FIGS. 13–15 exemplify a form of the folder which includes a core part as one panel 42 and another cover part as a remaining panel 43. FIG. 13 indicates the two parts are foldably joined along hold line 44. However, it is also possible that the cover and core part be separate components as such separation between a core and cover member is clearly taught in the example shown in FIGS. 1, 9, 17 and 18. The core part in the FIGS. 13–15 examples may include one or more article receiving pockets 16 and the cover part may be provided with the access 22 that will overlie and expose portions of the pockets adjacent edges of the core part when the unit is assembled. The cover part may be secured by adhesive, sonic welding, etc. to one of the surfaces of the remaining card in order to secure the two firmly together.

As indicated in FIGS. 8, 14 and 18 the removable strip 34 may be provided to expose a layer of pressure sensitive adhesive 32, thereby facilitating adhesive bonding of an identification card such as the business card C shown in FIGS. 9, 15 and 18. Thus, the configuration illustrated in FIGS. 8–15 and 18 may be provided with dimensions to accommodate standard size business identification cards so that such a card C may be attached to the article holder and thereby become one of the cover surfaces (FIG. 15). Also, as shown in FIG. 17, the card C may span one of the covers 18. In FIG. 18 the card C spans one of the two panels 42a, 43a.

Placement of the card C may be accomplished by the purchaser of the article holder in order that the purchaser's identification or business card may be attached to the holder. Alternatively, the holders with adhesive and removable strips 34 in place may be distributed to a business such that one or more identification cards may be attached to the article holders as a promotion or advertising for the business.

In fact, it is possible that both opposed surfaces of an assembled holder could be provided with adhesive surfaces, each to receive an identification card. However, it may be more preferable to provide a single surface 32 for identification card reception, while the opposite surface of the core is provided with a cover 19 (as shown in FIG. 9) having the access 22 previously formed thereon. If identification cards are used in place of both covers 18, 19, the access 22 should be appropriately formed in one of the cards to permit gripping of the article or articles held within the pocket(s) 16.

FIGS. 13–15 indicate additional flanges 46 that may be provided to guide positioning of an identification card. Such flanges 46 are clearly shown in FIGS. 14 and 15 and they are spaced apart by a distance just slightly greater than the width dimension of an identification card. The card C (FIG. 15) is used in this example to cover the core panel 42.

It should be noted that the article holder shown in FIGS. 8–15 may also be used with an electronically readable media such as a magnetic stripe or microchip arrangement for identification, transaction or other purposes.

The example shown in FIG. 18 uses only two panels 42a, 43a with each having a partially formed pocket 16 indentation formed therein. The two panels may be adhered or otherwise secured together with the pocket parts meeting to form one or more outwardly open pockets. One (or both) of the panels may be provided with adhesive 32 and a removable backing strip 34 that may be removed to allow adhesive bonding to an identification card C.

Exemplified forms of the present holder may be made by cutting the card body from a sheet or blank. Adhesive may then be applied to one or both surfaces of the card body. A cover can be attached to one surface of the core and a removable backing strip or another cover with an adhesive surface may be placed over the other core surface. The next step may be to expose the pressure sensitive adhesive surface 32 simply by pulling the removable strip 34 away from the surface. A selected identification card C may now be attached to the adhesive surface. The card will be adhesively secured to the core and may thereby become one of the cover surfaces (in the FIG. 15 example) partially enclosing the article receiving pocket(s) within the core part 17. Articles may now be selectively stored and removed from the pocket with the identification card and the remaining cover spanning the pockets to slidably hold the articles in place. Personal identification or business cards may be used in conjunction with the holder form exemplified in FIGS. 9 and 13–15, 17 and 18.

Figure 16:
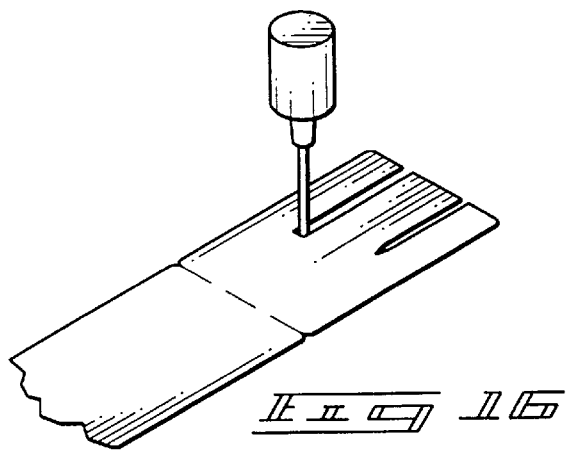
FIG. 16 is a view illustrating laser cutting of a blank sheet in a process for forming the exemplary article holders.

It is preferred to perform the process for making the article holder by cutting at least one of the covers from a sheet of plastic. This step is graphically indicated in FIG. 16 and is most preferably accomplished by use of laser cutting technology or by die cutting. It has been found that high production can be accomplished using laser cutting with a high degree of accuracy in the resulting component parts.

The single flat pattern configurations as exemplified in FIGS. 10–13, or the separate components shown in FIGS. 3 and 17 may be quickly and easily cut using laser cutting technology. The form illustrated in FIG. 18 is best formed by injection molding in order to appropriately form the pocket indentations. Individual component parts may be cut in the same manner from several sheets of material of different thicknesses if the cover thickness dimensions are to be different from the core part 17. Laser technology may be used to cut the covers and the core members from different sheets of material. Adhesive, welding, or other fastening processes and techniques may be used to secure the members together.

Once the article holder is assembled, use is a simple matter of presenting the holder (if used as a credit or transaction card) in the same manner as a typical card would be presented for purchase or transaction. Embossing 21, if provided, may be impressed using conventional card impressing equipment. Magnetic stripes, or other electronically readable indicia, if provided, may also be used in a conventional manner.

Forms of the holder used to display an identification card (FIGS. 9, 17, 18) may be used by removing the backing strip 34 and pressing the selected card C onto the adhesive surface 32.

If any of the articles are to be used, the user simply pulls the selected article away from the card, thereby extracting it from the associated pocket 16. The article may then be used in the manner intended. For example, the roughened surface identified in FIGS. 1 and 9 may be used as a fingernail file. A screwdriver article may be used for the typical intended purpose for that tool, while the same be true of the tweezers or toothpick. Once used, the article may be replaced in the associated pocket for storage until the next use.

From the above, it may be understood that the article holder has numerous functions and, due to the substantially thin nature of the core and cover components, may be stored in a compact configuration much in the same manner as an identification card or a transaction card.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electronically readable transaction card article holder, comprising:
    a body having a thickness dimension, a length dimension, and a width dimension;
    wherein the thickness dimension is less than the length and width dimensions;
    the body including an article holder zone;
    at least one pocket formed in the body within the article holder zone and shaped to releasably receive an article;
    a non-magnetic article releasably receivable within each pocket;
    the body including a cover spanning said at least one pocket;
    an access opening into said at least one pocket allowing finger access to the article;
    an electronically readable zone formed along the body; and
    electronically readable media formed across the electronically readable zone.

2. The article holder of claim 1 wherein the thickness dimension is less than 0.045 inch.

3. The article holder of claim 1 wherein the body is shaped as a rectangle measuring approximately 2.125 inches by 3.375 inches and having a thickness dimension less than 0.045 inches.

4. The article holder of claim 1 wherein the body includes a pair of covers laminated with a core part and wherein the pair of covers include thickness dimensions of approximately 0.007 inches and the core part includes a thickness dimension of approximately 0.020 inches.

5. The article holder of claim 1 wherein the body includes a pair of covers laminated with a core part and wherein said at least one pocket is formed in the core part and the access opening is formed in at least one of the covers adjacent each pocket.

6. The article holder of claim 1 wherein the electronically readable zone includes a magnetic stripe spaced from the article holder zone.

7. The article holder of claim 1 wherein the article is formed of non-magnetic stainless steel.

8. The article holder of claim 1 wherein the body includes a pair of covers and a core part and wherein at least one of the pair of covers is foldably joined to the core part and is folded against and secured to one of the surfaces.

9. An article holder, comprising:
    a body having a thickness dimension, a length dimension, and a width dimension;
    wherein the thickness dimension is less than the length and width dimensions;
    the body including a front surface and a back surface;
    the body further including an article holder zone;
    at least one pocket formed in the body within the article holder zone, shaped to releasably receive an article;
    a pressure sensitive adhesive formed along at least a part of the front surface;
    a removable strip covering the pressure sensitive adhesive; and
    wherein the front surface and pressure sensitive adhesive are shaped and disposed to receive and secure an identification card cover on the body.

10. The article holder of claim 9 wherein the front and back surfaces are defined by covers spanning a core part and wherein at least one of the covers and core part are at least partially transparent.

11. The article holder of claim 9 wherein one of the surfaces is defined by a cover foldably joined to a core part and wherein the core part includes said at least one pocket.

12. The article holder of claim 9 wherein one of the surfaces is defined by a cover laminated to a core part; and wherein the core part includes the front surface.

13. The article holder of claim 9 wherein the body is comprised of:
    a first laminate formed as a cover and defining the back surface;
    a core part laminated to the first laminate and defining said at least one pocket;
    a second laminate defining the front surface and laminated to the core part.

14. The article holder of claim 9 wherein the body is comprised of at least two card-shaped parts, each including an indentation forming a part of said at least one pocket; wherein the card-shaped parts are assembled with the indentations joined to form said at least one pocket; and wherein the front surface is on one of the card-shaped parts.

15. A process for producing a flat article holder, comprising the steps of:
   providing a card body including at least one pocket shaped to releasably receive an article;
   exposing a pressure sensitive adhesive surface on the card body; wherein said step of exposing the pressure sensitive adhesive includes the step of removing a backing strip from the adhesive;
   adhering an identification card to the adhesive surface such that the identification card spans the pocket; and
   selectively storing and removing an article to and from said at least one pocket.

16. A process for producing a flat article holder, comprising the steps of:
   providing a card body including at least one pocket shaped to releasably receive an article;
   exposing a pressure sensitive adhesive surface on the card body;
   adhering an identification card to the adhesive surface such that the identification card spans the pocket;
   selectively storing and removing an article to and from said at least one pocket;
   providing an electronically readable media along the card body.

17. A process for making an electronically readable transaction card article holder, comprising the steps of:
   providing a card body in the shape of a transaction card and having oppositely facing front and back surfaces;
   forming at least one article receiving pocket in the card body;
   covering said at least one pocket on at least one surface;
   providing finger access to the at least one article receiving pocket to enable manual placement and removal of an article to and from the said at least one article receiving pocket; and
   providing electronically readable media along the body.

18. A process for forming a flat article holder, comprising the steps of:
   obtaining a sheet of plastic having a front and a back surface;
   cutting the sheet through the front and back surfaces to form a core part with at least one article receiving pocket;
   laminating a first cover sheet to the front surface to span at least portions of said at least one article receiving pocket;
   laminating a second cover sheet to the back surface to span at least portions of said at least one article receiving pocket;
   providing for finger access to said at least one article receiving pocket;
   providing an adhesive surface on one of the cover sheets; and
   providing a removable backing strip over the adhesive surface.

19. The process of claim 18 comprising the further step of providing electronically readable media on at least one of the covers.

20. The process of claim 18 comprising the further step of providing electronically readable media on at least one of the covers in the form of a magnetic stripe.

21. The process of claim 18 wherein the step of cutting the sheet is accomplished by laser cutting the sheet to form the core part and at least one of the covers from the sheet of plastic.

22. The process of claim 18 wherein the core part and at least one of the cover sheets are foldably joined and wherein at least one of the laminating steps is accomplished by folding said at least one of the cover sheets onto the core part.

23. The process of claim 18 including the further step of removing the backing strip and attaching an identification card to the adhesive surface.

* * * * *

UNITED STATES PATENT AND TRADEMARK OFFICE
CERTIFICATE OF CORRECTION

PATENT NO. : 6,571,940 B2  
DATED : June 3, 2003  
INVENTOR(S) : Chris M. Newman It is certified that error appears in the above-identified patent and that said Letters Patent is hereby corrected as shown below:

<u>Column 10,</u>
Line 5, replace "cuffing" with -- cutting --.

Signed and Sealed this

Fifteenth Day of March, 2005

JON W. DUDAS  
*Director of the United States Patent and Trademark Office*